June 7, 1966  T. L. SMITH  3,254,387
PIPE CLAMP LUG WITH BAND GRIPPING JAWS
Filed March 13, 1964  2 Sheets-Sheet 1

INVENTOR.
TELFORD L. SMITH
BY
P. Donham Owen
ATTORNEY

June 7, 1966  T. L. SMITH  3,254,387
PIPE CLAMP LUG WITH BAND GRIPPING JAWS
Filed March 13, 1964  2 Sheets-Sheet 2

INVENTOR.
TELFORD L. SMITH
BY
*O Donham Owen*
ATTORNEY

United States Patent Office 3,254,387
Patented June 7, 1966

3,254,387
PIPE CLAMP LUG WITH BAND GRIPPING JAWS
Telford L. Smith, Millbrae, Calif., assignor to Smith-Blair, Inc., San Francisco, Calif., a corporation of California
Filed Mar. 13, 1964, Ser. No. 351,655
7 Claims. (Cl. 24—279)

This invention relates to pipe repair clamps of the type in which rigid lugs are used to bring together the ends of a malleable band that extends around the pipe. More particularly, the invention relates to an improved lug structure for securing the ends of the band to the lugs.

In the art of pipe clamps of the malleable band type a considerable effort has been made to solve the problem of securing the ends of the band to rigid lugs with sufficient strength to withstand the high band tightening forces that are exerted during the installation of such clamps. Aside from the stringent strength requirement, another aspect of this problem was to provide a lug and band connection construction which is also practical and economical to manufacture. Thus, one major object of the present invention is to provide an improved pipe clamp structure for connecting the ends of a malleable band to a pair of rigid lugs so that the band cannot possibly slip away or break loose from the lugs, even when an unusually large tightening force is applied to draw the lugs together on a pipe.

Another important object of the invention is to provide an improved lug structure in a pipe clamp for securing the lugs to the flexible band, one that not only has unusual strength characteristics but which is also particularly well adapted for ease and economy of manufacture.

In one earlier form of pipe clamp the attachment of the band to the lug was commonly accomplished by crimping the band ends into milled slots in the lugs. However, the milling operation was an expensive manufacturing step and, in addition, this form of connection was often not tight enough, the band ends tending to slip out of the slot when pressure was applied during the tightening of the bolts. Any slipping of the band away from the lug made the clamp useless. In other later forms of clamps, attempts were made to solve the problem by the use of auxiliary wedges and rods retained by portions of the lugs for holding the band ends in place. In addition to the extra parts required, this latter attachment method also required complicated manufacturing steps and thus increased the overall cost of the clamps. In a more recent development in the pipe clamp art, as disclosed in U.S. Patent No. 3,089,212, the lugs are cast from a malleable metal material with jaw portions originally in the open position which can be closed together on the end of the band.

Still another object of the invention is to provide an improved means for attaching a malleable band to a pair of rigid pipe clamp lugs which utilizes the aforesaid basic concept of closable lug jaws but requires no precisely located recesses to match integral projections on the lug jaws. In accordance with the invention, lugs made from malleable material and originally cast in the spread apart or open position are constructed with a plurality of integral projections on one or both of the inner surfaces of the lug jaws. These projections function in cooperation with the portion of the band between the lug jaws as the jaws are closed to secure the band in place. The band end may be folded in a double thickness and be perforated, or it may have a single thickness and be unperforated. However, in all embodiments a strong locking connection is provided between the malleable band and the lugs which prevents any movement or slippage of the band even when large forces are exerted in drawing the lugs together.

Other objects, advantages and features of the invention will become apparent from the following detailed description, and from the drawings, in which.

Figure 1:
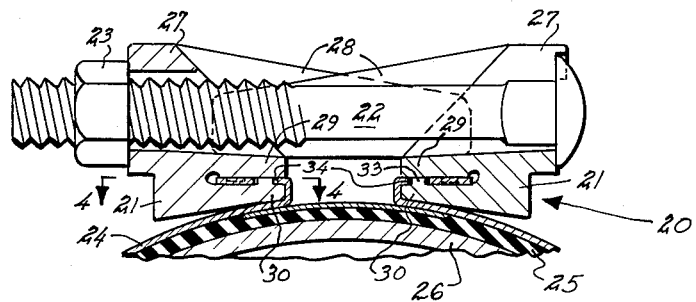
FIG. 1 is a fragmentary view in elevation and in section showing a pipe clamp with band connection means embodying the principles of the invention.

With reference to the drawings, FIG. 1 shows a cross sectional view of a pipe clamp 20 embodying the principles of the invention. Generally, it comprises a pair of lug members 21 that are connected together by a series of bolts 22, each having a nut 23 threaded to one end thereof, and thus adapted to move the lugs towards each other when the nuts are tightened. The lugs 21 are made from malleable iron or some other suitable metal material which can be bent or coined after casting instead of being brittle like cast iron, for example. Each lug is connected to one end of a flexible band or sleeve 24 made from malleable sheet metal material, and band extends around a gasket 25 covering the leak in the pipe 26 which is being repaired.

The lugs 21, as shown, are generally bar shaped members that extend axially along the pipe and are preferably provided with an even number of upwardly extending spaced apart projections 27 for supporting the bolts and nuts. The lugs 21 may also have a number of stabilizing fingers 28, each of which extends outwardly across to and bears on the upper surface of the opposite lug to prevent the lugs from tipping as the bolts are tightened.

The lugs 21, as shown, may have any desired length and thus any number of bolts 22, depending on the size of the pipe break being repaired. More details concerning the placement and spacing of the bolts may be found in the aforesaid U.S. Patent No. 3,089,212. While I have shown, for illustrative purposes, a form of lugs having stabilizing fingers 28, it is to be understood that the present invention is not in any way concerned with such fingers, and thus is not limited to lugs having them.

Figure 2:
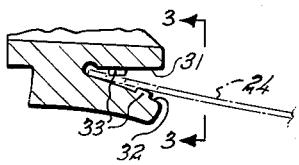
FIG. 2 is a fragmentary view in section of one lug of the pipe clamp of FIG. 1, said lug being shown in the cast open position.
Figure 3:
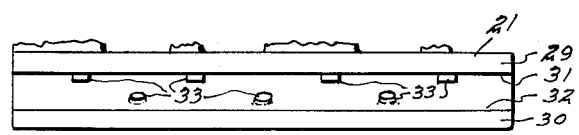
FIG. 3 is a front view in elevation taken at the line 3—3 of FIG. 2.
Figure 4:
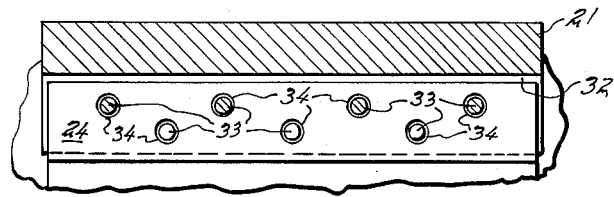
FIG. 4 is a plan view in section taken along line 4—4 of FIG. 1.

Both of the lugs 21 can be essentially identical in all respects relating to the features of the invention, and each is formed with upper and lower jaw portions 29 and 30. When formed, the lugs are cast with these jaws in the open position, as shown in FIG. 2, so that their inside jaw surfaces 31 and 32, respectively, are divergent or spread apart. In the embodiment of FIGS. 2–4 a plurality of integral projections 33 are formed on and extend above the inside jaw surfaces 31 and 32. These projections 33 have a relatively short length and extend above the surfaces 31 and 32 an amount that is no higher than the thickness of the malleable band 24, and preferably slightly less. As shown in FIG. 3, the projections are spaced apart longitudinally at uniform intervals along the lug jaw surfaces 31 and 33 and are preferably staggered so that they do not interfere with each other and so that all portions of the malleable band 24 between the lug jaws can be uniformly supported. The end portion of the malleable band 24 between the lug jaws 29 and 30 is perforated with openings 34 that register with the projections 33 when the jaws are closed.

When the clamp 20 is assembled, the open lugs 21 are placed in a heavy press with the band end between the jaws 29 and 30 and properly aligned with the projections 33. As the malleable jaws are coined closed on the band 24, the projections extend into the band openings to provide a firm locking action. The projections 33 cannot extend through the band and therefore they cannot engage the wall or inside surface of the opposite lug jaw. This allows the lug jaws to be brought flush against the band end, and with the projections entering it at predetermined intervals from opposite sides, a firm connection is formed.

Figure 5:
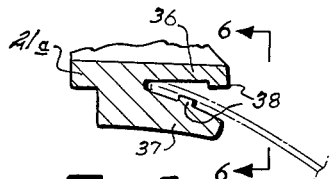
FIG. 5 is a fragmentary view in cross section of an alternate form of pipe clamp lug with jaws in the open position.
Figure 6:
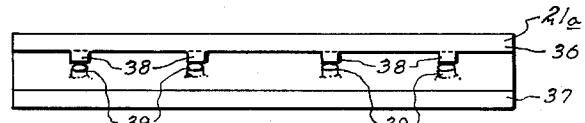
FIG. 6 is a front view in elevation taken at the line 6—6 of FIG. 4.
Figure 7:
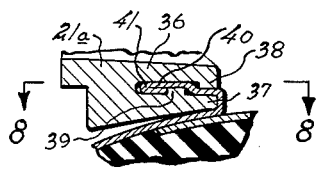
FIG. 7 is a fragmentary view in elevation showing the lug of FIG. 5 with its jaws in the closed position.
Figure 8:
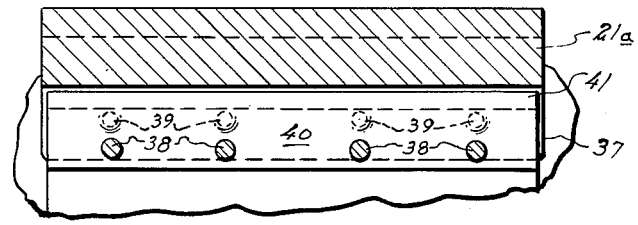
FIG. 8 is a plan view taken along the line 8—8 of FIG. 7.
Figure 9:
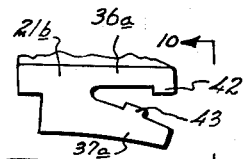
FIG. 9 is a fragmentary view in cross section of another alternate form of pipe clamp lug with jaws in the open position.
Figure 10:
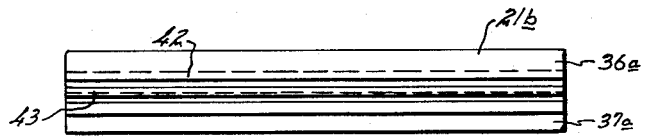
FIG. 10 is a front view in elevation taken along the line 10—10 of FIG. 9.
Figure 11:
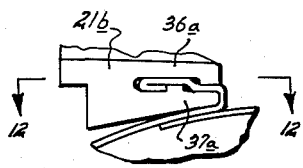
FIG. 11 is a fragmentary view in elevation showing the lug of FIG. 9 with its jaws in the closed position.
Figure 12:
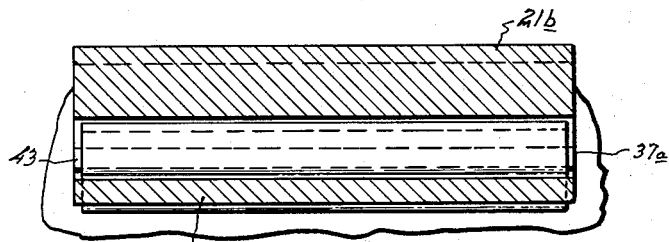
FIG. 12 is a plan view in section taken along the line 12—12 of FIG. 9.
Figure 13:
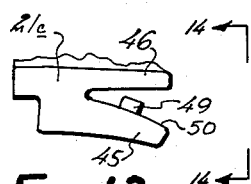
FIG. 13 is a fragmentary view in side elevation of still another embodiment of the invention.
Figure 14:
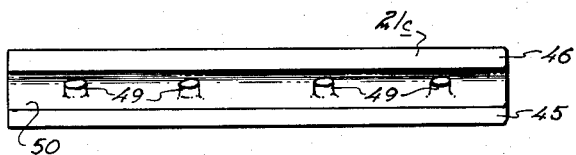
FIG. 14 is a front view in elevation taken at the line 14—14 of FIG. 13.
Figure 15:
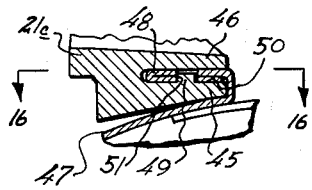
FIG. 15 is a fragmentary view in elevation showing the lug of FIG. 13 with its jaws in the closed position.
Figure 16:
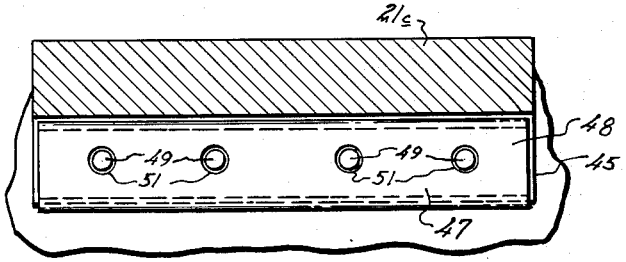
FIG. 16 is a view taken along the line 16—16 of FIG. 15.

In a somewhat modified form of the invention shown in FIGS. 5 to 8, each lug 21a has upper and lower jaw portions 36 and 37 and a series of spaced apart integral projections extending therefrom. However, on opposite lug jaws 36 and 37, the projections 38 are offset from each other a fixed predetermined amount. As shown, the projections on the upper jaw are farther away from the junction of the jaw members and they function in cooperation with those projections 39 of the lower jaw to upset and grip the portion of the band 40 between the jaws when the latter are closed together. In FIGS. 5 and 6 the lug jaws 36 and 37 are shown in the open position, and FIGS. 7 and 8 show how they appear after being closed. The front projection 38 on the upper jaw 36 is spaced forwardly from the rear projection 39 on the lower jaw 37 so that the band is forced to assume a locking type crimp as the jaws are pressed together. The end edge of the band 40 may have a folded back portion 41 which can be retained rearwardly of the lower jaw projection 39. This further helps to secure the band 40 between the jaws 36 and 37.

If desired, either the projections 38 or 39, or both sets, could be connected together to form continuous beads 42 and 43 along the lug jaw surfaces instead of spaced apart projections. This modification is shown in the lug 21b of FIGS. 9 to 12. Here, the beads on the opposing jaw members 36a and 37a are again offset so as to provide the upsetting action on the end of the band as the jaws are bent closed to lock the band in place.

Still another embodiment of the present invention is shown in FIGS. 13 to 16. Here a clamp lug 21c is provided with jaws 45 and 46 that are spaced farther apart to accommodate a malleable band 47 which is folded back to form a double thick end portion 48 having a width that will fit entirely between the lug jaws when closed. On one of the lug jaws, as for example, the lower jaw 45 as shown, are a series of integral projections 49. These projections extend higher above the lower jaw surface 50 than a single thickness of the band, but not higher than the double thickness of the folded back band end 48. The double thick folded band end is perforated with spaced apart openings 51 to accommodate the projections 49 which are secured in the openings when the lug jaws are coined closed. The advantage of this latter embodiment is that the projections 49 can be made longer than the band thickness and need be only on one jaw portion. When assembled the jaws thus grip the doubled band firmly even though an unusually large tightening force is applied to the lugs.

In all of the foregoing, a strong, durable an reliable band attaching construction for a pipe clamp has been provided with lugs having jaw portions which do not require small, precisely located recesses for receiving the ends of the projections. Yet, the lugs provide a secure connection to the band, are easier to manufacture, and thereby make possible an improved pipe clamp.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a pipe clamp of the type having a malleable band with end portions secured in lugs with the lugs in pairs and tightened together by bolts, the combination wherein each lug has a pair of malleable jaws between which said end portions fit, one jaw only having projections extending outwardly from the jaw surface, the other jaw having a substantially smooth surface, said projections having a length greater than one thickness but less than two thicknesses of said band, said band end portion being folded back and perforated to form openings in register with said projections, whereby when said lug jaws are closed, said projections are retained within the folded end of the band which is thereby secured to the lug.

2. In a pipe clamp of the type having a malleable band with end portions secured in lugs with the lugs in pairs and tightened together by bolts, the combination wherein each lug has a pair of malleable jaws originally cast in the open spread apart position and between which a said end portion fits, a plurality of intergal blunt end projections extending above and located along the inner surfaces of both said jaws, said inner jaw surfaces being otherwise substantially plane and free from recesses, each said projection extending above its jaw surface an amount that is slightly less than the thickness of the band, said projections on each said lug cooperating with a band end portion to secure it between the lug jaws when the jaws are coined together from their original open position.

3. The pipe clamp as described in claim 2 wherein each said lug jaw has a plurality of said projections spaced apart at predetermined locations on its surface, the projections of opposing lug jaws being staggered so that projections on one jaw are located between projections on the other jaw of the same lug, said band being perforated at its end portion to receive said projections between the lug jaws when they are coined together.

4. The pipe clamp as described in claim 2 wherein each said lug jaw has a plurality of said projections spaced apart at predetermined locations on its surface, said projections on one jaw being spaced rearwardly nearer the junction of the lug jaws, each being substantially in line with a cooperating offset projection on the upper jaw that lies further from the jaw junction when the jaws are together, the space between each adjacent pair of offset projections being somewhat greater than the thickness of the band, whereby an unperforated end portion of the band is upset and crimped between the offset cooperating pairs of projections when the jaws are coined together.

5. The pipe clamp as described in claim 4 wherein the end of the band between the lug jaws is folded back and retained between the rearwardly positioned projections on one jaw and the upper and lower jaw members.

6. The pipe clamp as described in claim 2 wherein the projections on the upper and lower jaw surfaces of each said lug are longitudinally extending bead like portions, the upper jaw having a continuous upper bead portion forming a downwardly projecting lip extending longitudinally along the leading edge of the upper jaw, a lower bead portion extending longitudinally along the surface of the lower jaw member, said latter projection being parallel to and offset rearwardly toward the junction of the lug jaws from the projection on the upper lug jaw, the space between the upper and lower projections being slightly greater than the thickness of the band, whereby the band end portion is upset and crimped between the two projections to lock it in place when the lug jaws are coined together.

7. The pipe clamp as described in claim 6 wherein the extreme end of the band end portion secured between the lug jaws is folded back and retained between the lower bead portion on the lower jaw and the junction of the upper and lower jaw members.

References Cited by the Examiner

UNITED STATES PATENTS

| | | | |
|---|---|---|---|
| 183,646 | 10/1876 | Dahm | 24—265 |
| 698,068 | 4/1902 | Snell | 24—265 |
| 967,664 | 8/1910 | Peterson | 24—265 |
| 1,316,387 | 9/1919 | Orewiler | 24—265 |
| 2,267,585 | 12/1941 | Churchill. | |
| 2,601,026 | 6/1952 | Jones | 24—243 X |
| 3,089,212 | 5/1963 | Graham et al. | 24—279 |

FOREIGN PATENTS 260,068 7/1949 Switzerland.

WILLIAM FELDMAN, *Primary Examiner.*

DONLEY J. STOCKING, *Examiner.*

D. GRIFFIN, *Assistant Examiner.*